United States Patent
Gwidt et al.

(10) Patent No.: US 12,122,354 B2
(45) Date of Patent: Oct. 22, 2024

(54) METHOD AND SYSTEM FOR CONTROLLING COLD START EMISSION REDUCTION

(71) Applicant: GM GLOBAL TECHNOLOGY OPERATIONS LLC, Detroit, MI (US)

(72) Inventors: J. Michael Gwidt, Brighton, MI (US); Daniel S Dimoski, Bloomfield Hills, MI (US); Daniel P Himes, Detroit, MI (US); Haresh Dayaljee Varu, Novi, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 274 days.

(21) Appl. No.: 17/661,606

(22) Filed: May 2, 2022

(65) Prior Publication Data

US 2023/0347871 A1    Nov. 2, 2023

(51) Int. Cl.
*B60W 20/16* (2016.01)
*B60W 20/40* (2016.01)
*B60W 30/192* (2012.01)

(52) U.S. Cl.
CPC ............ *B60W 20/16* (2016.01); *B60W 20/40* (2013.01); *B60W 30/192* (2013.01); *B60W 2510/083* (2013.01); *B60W 2555/20* (2020.02)

(58) Field of Classification Search
CPC .... B60W 20/16; B60W 20/40; B60W 30/192; B60W 2510/083; B60W 2555/20; B60W 10/06; B60W 10/08; B60W 10/02; B60W 2510/0657; B60W 2510/068; B60W 2710/083; B60W 20/50
See application file for complete search history.

(56) References Cited

U.S. PATENT DOCUMENTS

| | | | | | |
|---|---|---|---|---|---|
| 352,223 | A | * | 11/1886 | York | F23H 9/00 |
| | | | | | 126/155 |
| 11,473,518 | B1 | * | 10/2022 | Zhang | F02D 41/064 |
| 11,615,652 | B2 | * | 3/2023 | Koo | F02D 41/22 |
| | | | | | 701/31.4 |
| 2011/0088659 | A1 | * | 4/2011 | Wang | B60W 10/06 |
| | | | | | 701/110 |
| 2019/0323407 | A1 | * | 10/2019 | Dimoski | B01D 53/9495 |
| 2020/0180597 | A1 | * | 6/2020 | Hannon, Jr. | B60W 30/182 |

* cited by examiner

*Primary Examiner* — Ig T An
*Assistant Examiner* — Christine Nguyn Huynh
(74) *Attorney, Agent, or Firm* — Lorenz & Kopf LLP

(57) ABSTRACT

Methods and systems are provided for controlling a drive system in a hybrid electric vehicle. In an exemplary embodiment, the drive system has combustion engine and an electric motor, and a method includes: obtaining, via one or more sensors, sensor data pertaining to the hybrid electric vehicle; determining, via a processor, whether cold start emission reduction is required, based on the sensor data; and providing an increase in torque provided by the electric motor, via instructions provided by the processor to the drive system, when it is determined that the cold start emission reduction is required.

20 Claims, 2 Drawing Sheets

METHOD AND SYSTEM FOR CONTROLLING COLD START EMISSION REDUCTION

INTRODUCTION

The technical field generally relates to the field of hybrid electric vehicles and, more specifically, to control of cold start emission reduction processes in hybrid electric vehicles.

Certain hybrid electric vehicles today include both a combustion engine as well as an electric motor. In certain circumstances, emissions from the combustion engine may be relatively larger when the combustion engine is first started (e.g., a cold start) as compared with when the combustion engine is fully running. However, existing techniques for controlling the vehicle during such instances, including cold start emission reduction, may not always be optimal.

Accordingly, it is desirable to provide systems and methods for controlling hybrid electric vehicles during cold starts when combustion engines are turned on, including cold start emission reduction. Furthermore, other desirable features and characteristics of the present invention will become apparent from the subsequent detailed description of the invention and the appended claims, taken in conjunction with the accompanying drawings and this background of the invention.

SUMMARY

A method for controlling a drive system in a hybrid electric vehicle, the drive system having a combustion engine and an electric motor, the method including: obtaining, via one or more sensors, sensor data pertaining to the hybrid electric vehicle; determining, via a processor, whether cold start emission reduction is required, based on the sensor data; and providing an increase in torque provided by the electric motor, via instructions provided by the processor to the drive system, when it is determined that the cold start emission reduction is required.

Also in an exemplary embodiment, the method further includes providing retarding of spark of the combustion engine, simultaneous with the increase in torque provided by the electric motor, via the instructions provided by the processor to the drive system when it is determined that the cold start emission reduction is required, wherein the increase in torque provided by the electric motor is equal to a decrease in torque provided by the combustion engine as a result of the retarding of the spark.

Also in an exemplary embodiment: the step of obtaining the sensor data includes measuring, via one or more temperature sensors, an ambient temperature surrounding the hybrid electric vehicle; and the step of determining whether the cold start emission reduction is required includes determining, via the processor, whether the cold start emission reduction is required based on the ambient temperature.

Also in an exemplary embodiment, the steps of obtaining the sensor data, determining whether the cold start emission reduction is required, and providing the increase in torque provided by the electric motor are each performed as the combustion engine of the hybrid electric vehicle is being started and after the hybrid electric vehicle has already been travelling along a roadway powered by the electric motor.

Also in an exemplary embodiment, the method further includes: obtaining additional sensor data pertaining from the one or more sensors during the cold start emission reduction, the additional sensor data pertaining to a torque of the combustion engine and an exhaust temperature of the combustion engine; and performing diagnostics for the drive system, via the processor, using the additional sensor data.

Also in an exemplary embodiment, the method further includes reporting, via the processor based on the diagnostics performed on the additional sensor data: that the drive system has passed the diagnostics, when the torque and the exhaust temperature of the combustion engine are both within respective target ranges; and that the drive system has failed the diagnostics, when either the torque or the exhaust temperature, or both, of the combustion engine are not within the respective target ranges.

Also in an exemplary embodiment, the step of reporting includes reporting, via the processor based on the diagnostics performed on the additional sensor data: that the drive system has passed the diagnostics, when the torque and the exhaust temperature of the combustion engine are both greater than or equal to respective predetermined thresholds; and that the drive system has failed the diagnostics, when either the torque or the exhaust temperature, or both, of the combustion engine are less than the respective predetermined thresholds.

Also in an exemplary embodiment, the method further includes determining whether a shift is occurring in a transmission gear for the hybrid electric vehicle; wherein the diagnostics are paused when the shift is occurring in the transmission gear.

Also in an exemplary embodiment, the method further includes determining whether a traction control event, a stability control event, or both, are occurring; wherein the diagnostics are paused when the traction control event, the stability control event, or both are occurring.

In another exemplary embodiment, a system is provided for controlling a drive system in a hybrid electric vehicle, the drive system having a combustion engine and an electric motor, the system including: one or more sensors configured to generate sensor data pertaining to the hybrid electric vehicle; and a processor coupled to the one or more sensors and configured to at least facilitate: determining whether cold start emission reduction is required, based on the sensor data; and providing an increase in torque provided by the electric motor, via instructions provided by the processor to the drive system, when it is determined that the cold start emission reduction is required.

Also in an exemplary embodiment: the one or more sensors are further configured to generate additional sensor data pertaining to a torque of the combustion engine and an exhaust temperature of the combustion engine; and the processor is further configured to at least facilitate: performing diagnostics for the drive system, via the processor, using the additional sensor data; and reporting, via the processor based on the diagnostics performed on the additional sensor data: that the drive system has passed the diagnostics, when the torque and the exhaust temperature of the combustion engine are both within respective target ranges; and that the drive system has failed the diagnostics, when either the torque or the exhaust temperature, or both, of the combustion engine are not within the respective target ranges.

Also in an exemplary embodiment, a vehicle is provided that includes a drive system and a control system. The drive system includes a combustion engine and an electric motor. The control system includes one or more sensors and a processor. The one or more sensors are configured to generate sensor data pertaining to the vehicle. The processor is coupled to the one or more sensors, and is configured to at least facilitate: determining whether cold start emission reduction is required, based on the sensor data; and providing an increase in torque provided by the electric motor, via instructions provided by the processor to the drive system, when it is determined that the cold start emission reduction is required.

Also in an exemplary embodiment, the processor is further configured to at least facilitate providing retarding of spark of the combustion engine, simultaneous with the increase in torque provided by the electric motor, via the instructions provided by the processor to the drive system when it is determined that the cold start emission reduction is required, wherein the increase in torque provided by the electric motor is equal to a decrease in torque provided by the combustion engine as a result of the retarding of the spark.

Also in an exemplary embodiment: the one or more sensors are further configured to at least facilitate measuring an ambient temperature surrounding the vehicle; and the processor is further configured to at least facilitate determining whether the cold start emission reduction is required based on the ambient temperature.

Also in an exemplary embodiment, the one or more sensors are configured to generate the sensor data, and the processor is configured to at least facilitate determining whether the cold start emission reduction is required and providing the increase in torque provided by the electric motor as the combustion engine of the vehicle is being started and after the vehicle has already been travelling along a roadway powered by the electric motor.

Also in an exemplary embodiment: the one or more sensors are further configured to at least facilitate generating additional sensor data during the cold start emission reduction, the additional sensor data pertaining to a torque of the combustion engine and an exhaust temperature of the combustion engine; and the processor is further configured to at least facilitate performing diagnostics for the drive system, via the processor, using the additional sensor data.

Also in an exemplary embodiment, the processor is further configured to at least facilitate reporting, based on the diagnostics performed on the additional sensor data: that the drive system has passed the diagnostics, when the torque and the exhaust temperature of the combustion engine are both within respective target ranges; and that the drive system has failed the diagnostics, when either the torque or the exhaust temperature, or both, of the combustion engine are not within the respective target ranges.

Also in an exemplary embodiment, the processor is further configured to at least facilitate reporting, based on the diagnostics performed on the additional sensor data: that the drive system has passed the diagnostics, when the torque and the exhaust temperature of the combustion engine are both greater than or equal to respective predetermined thresholds; and that the drive system has failed the diagnostics, when either the torque or the exhaust temperature, or both, of the combustion engine are less than the respective predetermined thresholds.

Also in an exemplary embodiment, the processor is further configured to at least facilitate: determining whether a shift is occurring in a transmission gear for the vehicle; and pausing the diagnostics when the shift is occurring in the transmission gear.

Also in an exemplary embodiment, the processor is further configured to at least facilitate: determining whether a traction control event, a stability control event, or both, are occurring; and pausing the diagnostics when the traction control event, the stability control event, or both are occurring.

DESCRIPTION OF THE DRAWINGS

The present disclosure will hereinafter be described in conjunction with the following drawing figures, wherein like numerals denote like elements, and wherein.

DETAILED DESCRIPTION

The following detailed description is merely exemplary in nature and is not intended to limit the disclosure or the application and uses thereof. Furthermore, there is no intention to be bound by any theory presented in the preceding background or the following detailed description.

Figure 1:
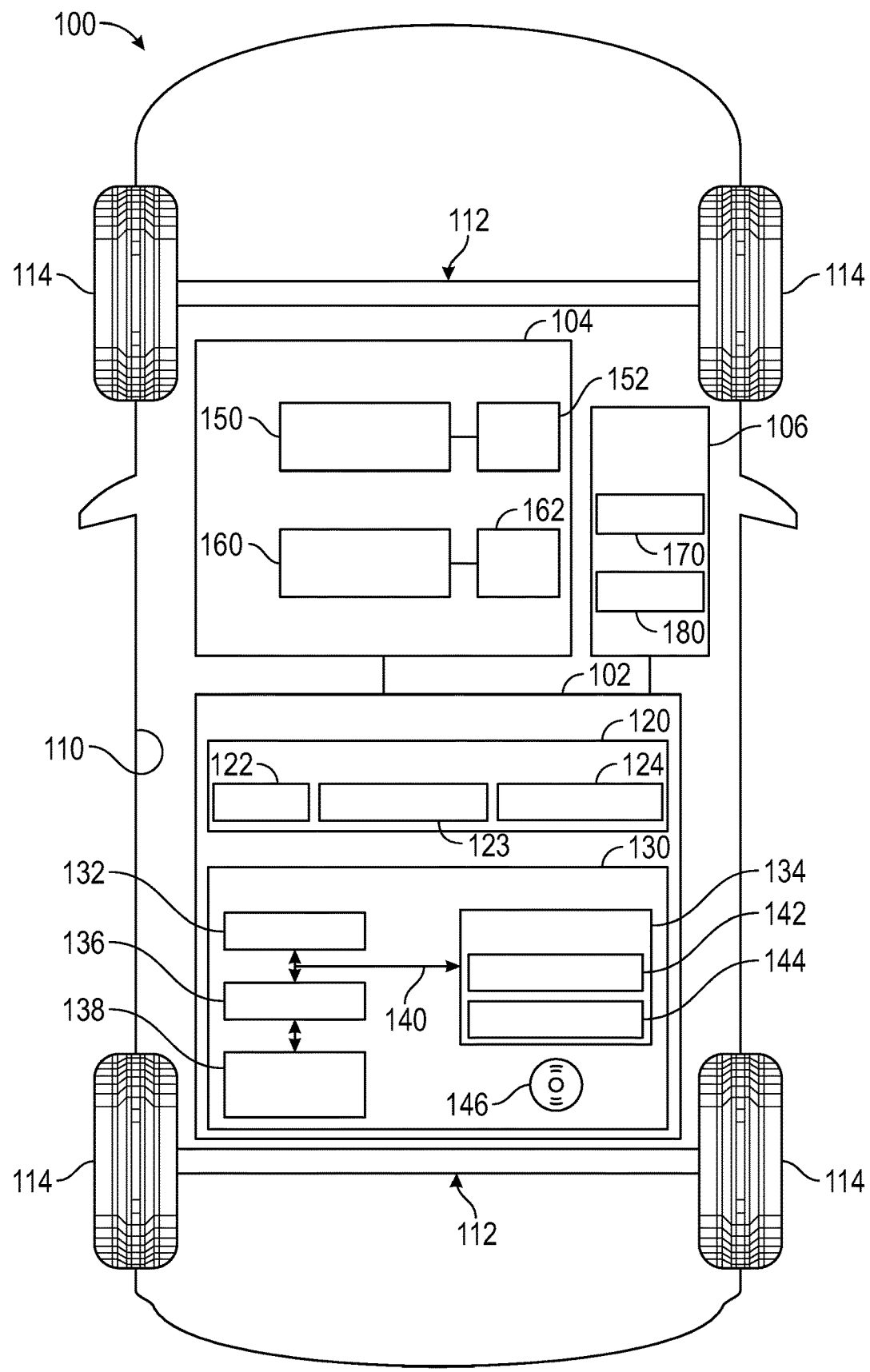
FIG. 1 is a functional block diagram of a hybrid electric vehicle that includes a drive system having a combustion engine and an electric motor, and a control system that controls the drive system, including during cold start emission reduction, in accordance with an exemplary embodiment.

FIG. 1 illustrates a vehicle 100, according to an exemplary embodiment. As described in greater detail further below, the vehicle 100 comprises a drive system 104 as well as a control system 102 that controls the drive system 104 during cold start emission reduction, in accordance with an exemplary embodiment.

In various embodiments, the vehicle 100 comprises a hybrid electric vehicle. In various embodiments, the drive system 104 includes both an electric motor 150 and a combustion engine 160. In various embodiments, the electric motor 150 is coupled to and charged by a rechargeable energy storage system (RESS) 152 of the vehicle 100, such as one or more vehicle batteries. In certain embodiments, the RESS 152 is configured to be charged by one or more electrical supply sources (e.g., electrical outlets, not depicted in FIG. 1) that may be disposed, for example, outside the vehicle 100. Also in various embodiments, the combustion engine 160 is coupled to one or more fuel sources 162 (e.g., a tank for gasoline, diesel, and/or other combustible fuel).

In certain embodiments, the vehicle 100 comprises an automobile. In various embodiments, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD), and/or various other types of vehicles in certain embodiments. In certain embodiments, the vehicle 100 may also comprise a motorcycle and/or one or more other types of vehicles. In addition, in various embodiments, it will also be appreciated that the vehicle 100 may comprise any number of other types of mobile platforms.

In the depicted embodiment, the vehicle 100 includes a body 110 that substantially encloses other components of the vehicle 100. Also in the depicted embodiment, the vehicle 100 includes a plurality of axles 112 and wheels 114. The wheels 114 are each rotationally coupled to one or more of the axles 112 near a respective corner of the body 110 to facilitate movement of the vehicle 100. In one embodiment, the vehicle 100 includes four wheels 114, although this may vary in other embodiments (for example for trucks and certain other vehicles). In various embodiments, the drive system 104 (described above) drives the wheels 114 for propulsion of the vehicle 100, including the body 110 thereof.

In various embodiments, the vehicle 100 may also include one or more other systems 106. In certain embodiments, such other systems 106 may include a stability control system 170, a traction control system 180, and/or one or more other systems 106.

In various embodiments, the control system 102 provides instructions for controlling the drive system 104, including during cold start emission reduction (e.g., when the combustion engine 160 is just starting and emissions may need to be reduced). In various embodiments, the control system 102's control of the drive system 104 includes, among other features, controlling and diagnosing a contribution of the electric motor 150 of the drive system 104 during cold start emission reduction for the vehicle 100. In various embodiments, the control system 102 provides these functions as described further below in connection with the process 200 of FIG. 2.

As depicted in FIG. 1, in various embodiments, the control system 102 includes a sensor array 120 and a controller 130.

In various embodiments, the sensor array 120 includes various sensors for measuring sensor data, including motor torque, transmission gear status, and exhaust temperature for the vehicle 100. As depicted in FIG. 1, in various embodiments, the sensor array 120 includes one or more engine sensors 122, transmission sensors 123, and temperature sensors 124.

In various embodiments, the one or more engine sensors 122 measure a torque of the combustion engine 160. In certain exemplary embodiments, the engine sensors 122 are part of or coupled to the combustion engine 160. In certain embodiments, the engine sensors 122 may also detect one or more faults of the drive system 104, such as of the combustion engine 160, the electric motor 150, and/or one or more electrical systems and/or other systems, devices, and/ or components pertaining thereto.

Also in various embodiments, the one or more transmission sensors 123 detect a transmission and/or operating gear of the vehicle 100 (e.g., park, reverse, neutral, or drive). In various embodiments, the transmission sensors 123 are part of or coupled to the drive system 104 and/or a gear selector and/or other user input device for the vehicle 100.

In addition, in various embodiments, the temperature sensors 124 measure a temperature of exhaust from the vehicle 100. In various embodiments, the temperature sensors 124 are part of or coupled to the drive system 104 and/or an exhaust system (not depicted) of the vehicle 100. Also in certain embodiments, the temperature sensors may also include one or more additional temperature sensors, including without limitation one or more ambient temperature sensors that are configured to measure an ambient temperature of an environment just outside and surrounding the vehicle 100.

Also in various embodiments, the controller 130 is coupled to the sensor array 120 as well as one or more of the other systems 106, and provides instructions for controlling the drive system 104, including commanding and diagnosing contribution by the electric motor 150 during cold start emission reduction with respect to the combustion engine 160. In various embodiments, these steps are performed in conjunction with the process 200 depicted in FIG. 2 and described further below in connection therewith.

As depicted in FIG. 1, in various embodiments, the controller 130 comprises a computer system comprising a processor 132, a memory 134, an interface, a storage device 138, a bus 140, and a disk 146. In certain embodiments, the controller 130 may also include the sensor array 120, one or more of the other systems 106 or components thereof, and/or one or more other vehicle components. In addition, it will be appreciated that the controller 130 may otherwise differ from the embodiment depicted in FIG. 1. For example, the controller 130 may be coupled to or may otherwise utilize one or more remote computer systems and/or other control systems, for example as part of one or more of the above-identified vehicle devices and systems.

In the depicted embodiment, the computer system of the controller 130 includes a processor 132, a memory 134, an interface 136, a storage device 138, and a bus 140. The processor 132 performs the computation and control functions of the controller 130, and may comprise any type of processor or multiple processors, single integrated circuits such as a microprocessor, or any suitable number of integrated circuit devices and/or circuit boards working in cooperation to accomplish the functions of a processing unit. During operation, the processor 132 executes one or more programs 142 contained within the memory 134 and, as such, controls the general operation of the controller 130 and the computer system of the controller 130, generally in executing the processes described herein, such as the process 200 discussed further below in connection with FIG. 2.

The memory 134 can be any type of suitable memory. For example, the memory 134 may include various types of dynamic random access memory (DRAM) such as SDRAM, the various types of static RAM (SRAM), and the various types of non-volatile memory (PROM, EPROM, and flash). In certain examples, the memory 134 is located on and/or co-located on the same computer chip as the processor 132. In the depicted embodiment, the memory 134 stores the above-referenced program 142 along with one or more stored values 144 (e.g., including, in various embodiments, predetermined threshold values for controlling emissions of the drive system).

The bus 140 serves to transmit programs, data, status and other information or signals between the various components of the computer system of the controller 130. The interface 136 allows communications to the computer system of the controller 130, for example from a system driver and/or another computer system, and can be implemented using any suitable method and apparatus. In one embodiment, the interface 136 obtains the various data from the sensor array 120, the drive system 104, and/or one or more other components and/or systems of the vehicle 100. The interface 136 can include one or more network interfaces to communicate with other systems or components. The interface 136 may also include one or more network interfaces to communicate with technicians, and/or one or more storage interfaces to connect to storage apparatuses, such as the storage device 138.

The storage device 138 can be any suitable type of storage apparatus, including various different types of direct access storage and/or other memory devices. In one exemplary embodiment, the storage device 138 comprises a program product from which memory 134 can receive a program 142 that executes one or more embodiments of one or more processes of the present disclosure, such as the steps of the process 200 discussed further below in connection with FIG. 2. In another exemplary embodiment, the program product may be directly stored in and/or otherwise accessed by the memory 134 and/or one or more other disks 146 and/or other memory devices.

The bus 140 can be any suitable physical or logical means of connecting computer systems and components. This includes, but is not limited to, direct hard-wired connections, fiber optics, infrared and wireless bus technologies. During operation, the program 142 is stored in the memory 134 and executed by the processor 132.

It will be appreciated that while this exemplary embodiment is described in the context of a fully functioning computer system, those skilled in the art will recognize that the mechanisms of the present disclosure are capable of being distributed as a program product with one or more types of non-transitory computer-readable signal bearing media used to store the program and the instructions thereof and carry out the distribution thereof, such as a non-transitory computer readable medium bearing the program and containing computer instructions stored therein for causing a computer processor (such as the processor 132) to perform and execute the program. Such a program product may take a variety of forms, and the present disclosure applies equally regardless of the particular type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments. It will similarly be appreciated that the computer system of the controller 130 may also otherwise differ from the embodiment depicted in FIG. 1, for example in that the computer system of the controller 130 may be coupled to or may otherwise utilize one or more remote computer systems and/or other control systems.

Figure 2:
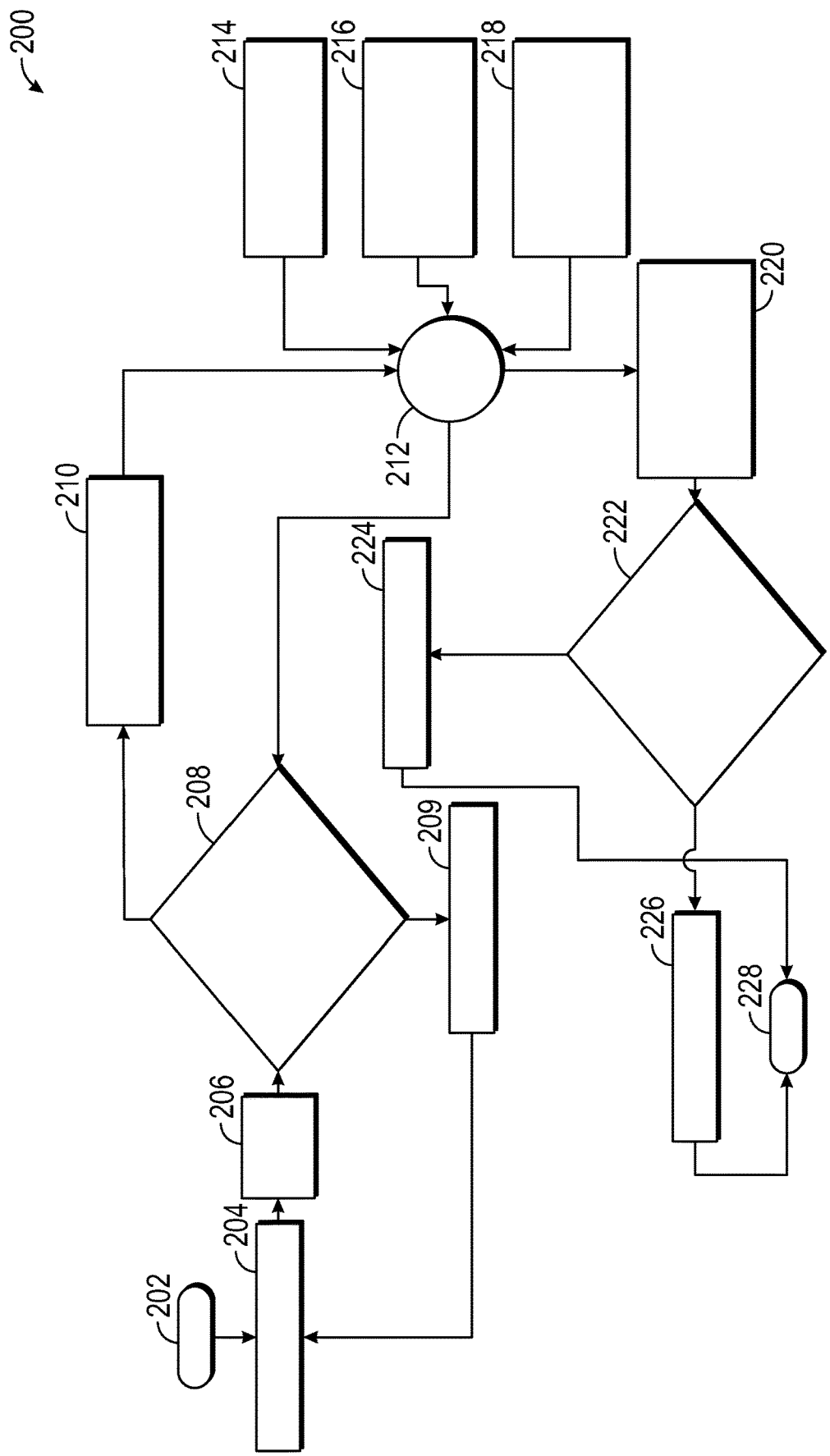
FIG. 2 is a flowchart of a process for controlling a drive system of a hybrid electric vehicle during cold start emission reduction, and that can be implemented in connection with the vehicle of FIG. 1, including the drive system and control system thereof, in accordance with an exemplary embodiment.

FIG. 2 is a flowchart of a process 200 for controlling a drive system of a vehicle during cold start emission reduction, in accordance with an exemplary embodiment. In various embodiments, the process 200 may be implemented in connection with the vehicle 100 of FIG. 1, including the drive system 104 and control system 102 thereof.

As depicted in FIG. 2, in various embodiments the process 200 begins at 202. In certain embodiments, the process 200 begins when one or more events occur to indicate that a combustion engine (such as the combustion engine 160) is starting and/or operating (step 204). In certain other embodiments, the process 200 may begin when the vehicle 100 is turned on, when the transmission of the vehicle 100 being placed in a "drive" mode, and/or when the control system 102 is turned on, or "woken up", and so on. In certain embodiments, the process 200 begins (and each of the steps of the process 200 are performed) as the combustion engine 160 of the vehicle 100 is being started and after the vehicle 100 has already been travelling along a roadway powered by the electric motor 150 of the vehicle 100.

Sensor data is collected at 206. In various embodiments, sensor data is collected from various sensors of the sensor array 120 of FIG. 1. In various embodiments, sensor data is obtained as to the engine torque, transmission gear, and exhaust temperature of the vehicle 100 from the engine sensors 122, transmission sensors 123, and temperature sensors 124, respectively, of FIG. 1 and provided to the processor 132 of the control system 102 of FIG. 1 for processing. Also in certain embodiments, an ambient temperature may also be obtained from one or more of the temperature sensors 124, and communications may be received from the other systems 106 of the vehicle 100 as to functioning or operation thereof, including as to whether stability control and/or traction control are being automatically implemented via the stability control system 170 and/or the traction control system 180 of FIG. 1, and so on.

In various embodiments, a determination is made as to whether a cold start emission reduction (CSER) is required (step 206). In various embodiments, the processor 132 of FIG. 1 makes this determination based on the sensor data of step 206 when the combustion engine 160 of FIG. 1 is starting, based on ambient temperature and/or other environmental conditions that may result in elevated emissions during the starting of the combustion engine 160. In certain embodiments, this determination is made after the vehicle 100 has already begun travelling down a roadway via power from the electric motor 150 of FIG. 1, prior to the starting of the combustion engine 160.

In various embodiments, if it is determined during step 206 that a CSER is not required, then in various embodiments the drive system maintains operation in the same manner as before (step 209). Specifically, in certain embodiments, the processor 132 of FIG. 1 provides instructions for the drive system 104 of FIG. 1 to continue operating as normal, without additional contributions from the electric motor 150. In various embodiments, the process repeats in a new iteration, for example when the combustion engine 160 of FIG. 1 re-starts in step 204, including with new sensor data of step 206.

Conversely, in various embodiments, if it is instead determined during step 206 that a CSER is required, then electric torque is requested from the electric motor (step 210). Specifically, in various embodiments, the processor 132 provides instructions to the drive system 104 to retard spark for the combustion engine 160 in order to reduce emissions while simultaneously increasing torque provided by the electric motor 150. Accordingly, in various embodiments, the instructions provided by the processor 132 are carried out by the drive system 104 in a manner that results in reduced torque for the combustion engine 160 (due to the retarding of the spark to reduce exhaust during starting of the combustion engine 160), and this reduction of torque of the combustion engine 160 is compensated for by an equal increase in the torque of the electric motor 150, so as to continue the desired movement of the vehicle 100 in accordance with instructions provided by the user (e.g., via an accelerator pedal and/or other user input devices for the vehicle 100) while the CSER is being implemented during the starting of the combustion engine 160.

Also in various embodiments, a determination is made during step 212 as to whether various conditions associated with the CSER are in effect. Specifically, in certain embodiments, the processor 132 utilizes the sensor data of step 206 and/or inputs from the drive system 104 and/or other systems 106 of FIG. 1 in determining whether a first condition 214, a second condition 216, and a third condition 218 associated with the CSER are each in effect.

In various embodiments, the first condition 214 is that a transmission gear shift is not occurring (i.e., that "transmission shift=false", meaning that the transmission gear is not shifting between park, reverse, neutral, and/or drive, and so on). In certain embodiments, the first condition is determined (e.g., by the processor 132 of FIG. 1) via sensor data from the transmission sensors 123 of FIG. 1.

Also in various embodiments, the second condition 216 is that a traction or stability control event is not occurring (i.e., that "traction/stability control event=false", meaning that neither the stability control system 170 nor the traction control system 180 are exercising automated vehicle control based on traction or stability conditions). In certain embodiments, the second condition is determined (e.g., by the processor 132 of FIG. 1) based on communications from the stability control system 170 and/or the traction control system 180 of FIG. 1.

In addition, in various embodiments, the third condition 218 is that an engine or electric fault is not occurring (i.e., that "other engine or electric fault=false", meaning that there are no faults detected with the combustion engine 160, electric motor 150, and/or other systems pertaining thereto). In certain embodiments, the third condition is determined (e.g., by the processor 132 of FIG. 1) based on sensor data from the one or more engine sensors 122 of FIG. 1.

In various embodiments, the determinations of step 212 as to the conditions 214, 216, and 218 are used to initiate and/or pause diagnostics of the drive system 104 (including the combustion engine 160) during the cold start emission reduction event.

In various embodiments, if it is determined during step 212 that one or more of the conditions 214, 216, and/or 218 are not satisfied, then the process returns to step 208. In various embodiments, step 208 then proceeds in a new iteration, with updated data from the sensor array 120 of FIG. 1 and from the drive system 104 and other systems 106 of FIG. 1. In various embodiments, when that one or more of the conditions 214, 216, and/or 218 are not satisfied and the process returns to step 208, then diagnostics (e.g., of steps 220 and 220 described below) are not performed during this cold start emission reduction event (or portion thereof).

Conversely, also in various embodiments, if it is instead determined during step 212 that each of conditions 214, 216, and 218 are satisfied, then the process proceeds instead to steps 220 and 222, as diagnostics are performed for the drive system 104 (including the combustion engine 160 thereof), as described below.

Specifically, in various embodiments, during step 220 engine torque and exhaust temperature are monitored. Specifically, in various embodiments of step 220, the processor 132 of FIG. 1 monitors sensor data received from the engine sensors 122 and the temperature sensors 124 of FIG. 1 as to the torque and the exhaust temperature, respectively, of the combustion engine 160 of FIG. 1.

Also in various embodiments, a determination is made as to whether engine conditions are within a target range (step 222) as part of diagnostics for the drive system 104 and the combustion engine 160 thereof. Specifically, in various embodiments, the processor 132 determines whether the engine torque and exhaust temperature of the combustion engine 160, as monitored in step 220, are both within acceptable, or target, ranges. In certain embodiments, the engine torque is determined to be in an acceptable range when the engine torque is greater than or equal to a first predetermined threshold, and the exhaust temperature is determined to be in an acceptable range when the exhaust temperature is greater than or equal to a second predetermined threshold. Also in certain embodiments, these first and second predetermined thresholds are stored in the memory 134 of FIG. 1 as stored values 144 thereof. In certain exemplary embodiments, the engine torque is determined to be in an acceptable range when the engine torque is between forty and eighty Newton-meters (40-80 nm), and the exhaust temperature is determined to be in an acceptable range when the exhaust temperature is greater than 400 degrees Celsius (400° C.).

As alluded to above with reference back to step 212, if it is determined at any time during an iteration of step 212 that any of the conditions 214, 216, 218 are not satisfied (e.g., that a shift is occurring in transmission gear, a traction control event, stability control event, or both are occurring, or that another engine or electric fault is detected), then the diagnostics of steps 220 and 222 are paused, and the process returns to step 208 as described above.

With reference back to step 222, if it is determined during step 222 that one or more engine conditions are not within their respective target ranges, then the drive system or engine is reported to have failed (step 224). Specifically, in various embodiments, when the engine torque is less than the first predetermined threshold, or the exhaust temperature is less than the second predetermined temperature, or both, the processor 132 determines that the drive system 104 (including the combustion engine 160) of FIG. 1 has failed the diagnostic test. In certain embodiments, this failing of the diagnostic test is stored in the memory 134 and/or communicated to one or more individuals and/or entities (e.g., a driver or other user of the vehicle, a repair shop or service technician, and so on) for servicing of the vehicle 100. For example, in certain embodiments, the failing of the diagnostic test may require further diagnostics and/or servicing of the drive system 104, such as the combustion engine 160, the electric motor, the RESS 152, and/or various other components of the drive system 104, and may be utilized in connection with such diagnostics and/or servicing. Also in certain embodiments, a notification may be provided as part of step 224 that servicing of the drive system 104 is recommended at this time based on the diagnostics of the process 200.

Conversely, also in various embodiments, if it is instead determined that all engine conditions are within their respective target ranges, then the drive system or engine is reported to have passed (step 226). Specifically, in various embodiments, when both the engine torque and the exhaust temperature are greater than or equal to their respective predetermined thresholds, the processor 132 determines that the drive system 104 (including the combustion engine 160) of FIG. 1 has passed the diagnostic test. In certain embodiments, this passing of the diagnostic test is stored in the memory 134 and/or communicated to one or more individuals and/or entities (e.g., a driver or other user of the vehicle, a repair shop or service technician, and so on) for future knowledge for use while the vehicle 100 is serviced, and/or for understanding that there are no detected faults from the process 200 that warrant servicing of the drive system 104 at this time. Also in certain embodiments, a notification may be provided as part of step 226 that servicing of the drive system 104 is not required at this time based on the diagnostics of the process 200.

In various embodiments, after the reporting is provided (at step 224 or 226), the process then terminates at step 228.

Accordingly, methods, systems, and vehicles are provided for control of a drive system of a vehicle during cold start emission control for the vehicle. In various embodiments, a torque contribution of an electric motor of the drive system is requested during the cold start emission control, for example in order to compensate for loss in combustion engine torque and to keep the vehicle moving in a desired manner during the cold start emission control. Also in various embodiments, an engine torque and exhaust temperature of the combustion engine are also monitored for diagnosis of potential drive system faults during the cold start emission control for the vehicle.

It will be appreciated that the systems, vehicles, applications, and implementations may vary from those depicted in the Figures and described herein. For example, in various embodiments, the vehicle 100, control system 102, drive system 104, components thereof, and/or other components may differ from those depicted in FIG. 1 and/or described above in connection therewith. It will also be appreciated that the steps of the process 200 may differ, and/or that various steps thereof may be performed simultaneously and/or in a different order, than those depicted in FIG. 2 and/or described above.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. A method for controlling a drive system in a hybrid electric vehicle, the drive system having a combustion engine and an electric motor, the method comprising:
    obtaining, via sensors, sensor data pertaining to the hybrid electric vehicle, including as to an ambient temperature outside the vehicle, an engine torque of the combustion engine, and an engine exhaust temperature of the combustion engine;
    determining, via a processor, whether cold start emission reduction is required, based on the ambient temperature from the sensor data;
    providing an increase in torque provided by the electric motor, via instructions provided by the processor to the drive system, when it is determined that the cold start emission reduction is required based on the ambient temperature;
    following the increase in torque provided by the electric motor, performing diagnostics for the drive system, via the processor, using the sensor data; and
    reporting, via the processor based on the diagnostics performed on the sensor data, as follows:
        reporting that the drive system has passed the diagnostics, when it is determined that both:
            the torque of the combustion engine is within a first range; and
            the exhaust temperature of the combustion engine is within a second range; and
        reporting that the drive system has failed the diagnostics, when either the torque of the combustion is not within the first range, the exhaust temperature of the combustion engine is not within the second range, or both;
    wherein the reporting step comprises:
        reporting that the drive system has passed the diagnostics, when it is determined that both:
            the torque of the combustion engine is both greater than a first threshold value and less than a second threshold value; and
            the exhaust temperature of the combustion engine is greater than a third threshold value; and
        reporting that the driver system has failed the diagnostics, when it is determined that one or more of the following conditions are true:
            the torque of the combustion engine is less than the first threshold value;
            the torque of the combustion engine is greater than the second threshold value; or
            the exhaust temperature of the combustion engine is less than the third threshold value.

2. The method of claim 1, further comprising:
    providing retarding of spark of the combustion engine, simultaneous with the increase in torque provided by the electric motor, via the instructions provided by the processor to the drive system when it is determined that the cold start emission reduction is required, wherein the increase in torque provided by the electric motor is equal to a decrease in torque provided by the combustion engine as a result of the retarding of the spark.

3. The method of claim 1, wherein the steps of obtaining the sensor data, determining whether the cold start emission reduction is required, and providing the increase in torque provided by the electric motor are each performed as the combustion engine of the hybrid electric vehicle is being started and after the hybrid electric vehicle has already been travelling along a roadway powered by the electric motor.

4. The method of claim 1, further comprising:
    determining whether a shift is occurring in a transmission gear for the hybrid electric vehicle;
    wherein the diagnostics are paused when the shift is occurring in the transmission gear.

5. The method of claim 1, further comprising:
    determining whether a traction control event, a stability control event, or both, are occurring;
    wherein the diagnostics are paused when the traction control event, the stability control event, or both are occurring.

6. The method of claim 1, wherein the reporting step comprises:
    reporting that the drive system has passed the diagnostics, when it is determined that both:
        the torque of the combustion engine is both greater than a first threshold value and less than a second threshold value; and
        the exhaust temperature of the combustion engine is greater than a third threshold value; and
    reporting that the driver system has failed the diagnostics, when it is determined that one or more of the following conditions are true:
        the torque of the combustion engine is less than the first threshold value;
        the torque of the combustion engine is greater than the second threshold value; or
        the exhaust temperature of the combustion engine is less than the third threshold value.

7. The method of claim 1, wherein:
    the first threshold value is equal to approximately 40 nm;
    the second threshold value is equal to approximately 80 nm; and
    the third threshold value is equal to approximately 400 degrees Celsius.

8. The method of claim 1, wherein the reporting step comprises:
    reporting that the drive system has passed the diagnostics, when it is determined that both:
        the torque of the combustion engine is both greater than 40 nm and less than 80 nm; and
        the exhaust temperature of the combustion engine is greater than 400 degrees Celsius; and
    reporting that the driver system has failed the diagnostics, when it is determined that one or more of the following conditions are true:
        the torque of the combustion engine is less than 40 nm;
        the torque of the combustion engine is greater than 80 nm; or the exhaust temperature of the combustion engine is less than 400 degrees Celsius.

9. The method of claim 1, further comprising:
determining whether a shift is occurring in a transmission gear for the hybrid electric vehicle;
determining, via the processor, whether a traction control event is occurring;
determining, via the processor, whether a stability control event is occurring;
determining, via the processor, whether an electric fault is detected;
determining, via the processor, whether another engine fault is detected; and
pausing the diagnostics, in accordance with instructions provided by the processor, when one or more of the following conditions are true:
a shift is determined to be occurring in the transmission gear for the hybrid electric vehicle;
a traction control event is determined to be occurring;
a stability control event is determined to be occurring;
an electric fault is detected; or
another engine fault is detected.

10. A system for controlling a drive system in a hybrid electric vehicle, the drive system having a combustion engine and an electric motor, the system comprising:
sensors configured to generate sensor data pertaining to the hybrid electric vehicle, including as to an ambient temperature outside the vehicle, an engine torque of the combustion engine, and an engine exhaust temperature of the combustion engine; and
a processor coupled to the sensors and configured to at least facilitate:
determining whether cold start emission reduction is required, based on the ambient temperature from the sensor data; and
providing an increase in torque provided by the electric motor, via instructions provided by the processor to the drive system, when it is determined that the cold start emission reduction is required based on the ambient temperature;
following the increase in torque provided by the electric motor, performing diagnostics for the drive system, via the processor, using the sensor data; and
reporting, via the processor based on the diagnostics performed on the sensor data, as follows:
reporting that the drive system has passed the diagnostics, when it is determined that both:
the torque of the combustion engine is within a first range; and
the exhaust temperature of the combustion engine is within a second range; and
reporting that the drive system has failed the diagnostics, when either the torque of the combustion is not within the first range, the exhaust temperature of the combustion engine is not within the second range, or both;
wherein the processor is further configured to at least facilitate:
reporting that the drive system has passed the diagnostics, when it is determined that both:
the torque of the combustion engine is both greater than a first threshold value and less than a second threshold value; and
the exhaust temperature of the combustion engine is greater than a third threshold value; and
reporting that the driver system has failed the diagnostics, when it is determined that one or more of the following conditions are true:
the torque of the combustion engine is less than the first threshold value;
the torque of the combustion engine is greater than the second threshold value; or
the exhaust temperature of the combustion engine is less than the third threshold value.

11. The system of claim 10, wherein the processor is further configured to at least facilitate:
reporting that the drive system has passed the diagnostics, when it is determined that both:
the torque of the combustion engine is both greater than a first threshold value and less than a second threshold value; and
the exhaust temperature of the combustion engine is greater than a third threshold value; and
reporting that the driver system has failed the diagnostics, when it is determined that one or more of the following conditions are true:
the torque of the combustion engine is less than the first threshold value;
the torque of the combustion engine is greater than the second threshold value; or
the exhaust temperature of the combustion engine is less than the third threshold value.

12. A vehicle comprising:
a drive system comprising:
a combustion engine; and
an electric motor; and
a control system comprising:
sensors configured to generate sensor data pertaining to the vehicle, including as to an ambient temperature outside the vehicle, an engine torque of the combustion engine, and an engine exhaust temperature of the combustion engine; and
a processor coupled to the sensors and configured to at least facilitate:
determining whether cold start emission reduction is required, based on the ambient temperature from the sensor data; and
providing an increase in torque provided by the electric motor, via instructions provided by the processor to the drive system, when it is determined that the cold start emission reduction is required based on the ambient temperature;
following the increase in torque provided by the electric motor, performing diagnostics for the drive system, via the processor, using the sensor data; and reporting, via the processor based on the diagnostics performed on the sensor data, as follows:
reporting that the drive system has passed the diagnostics, when it is determined that both:
the torque of the combustion engine is within a first range; and
the exhaust temperature of the combustion engine is within a second range; and
reporting that the drive system has failed the diagnostics, when either the torque of the combustion is not within the first range, the exhaust temperature of the combustion engine is not within the second range, or both;
wherein the processor is further configured to at least facilitate:

reporting that the drive system has passed the diagnostics, when it is determined that both:
: the torque of the combustion engine is both greater than a first threshold value and less than a second threshold value; and
: the exhaust temperature of the combustion engine is greater than a third threshold value; and reporting that the driver system has failed the diagnostics, when it is determined that one or more of the following conditions are true:
: the torque of the combustion engine is less than the first threshold value;
: the torque of the combustion engine is greater than the second threshold value; or
: the exhaust temperature of the combustion engine is less than the third threshold value.

13. The vehicle of claim 12, wherein the processor is further configured to at least facilitate providing retarding of spark of the combustion engine, simultaneous with the increase in torque provided by the electric motor, via the instructions provided by the processor to the drive system when it is determined that the cold start emission reduction is required, wherein the increase in torque provided by the electric motor is equal to a decrease in torque provided by the combustion engine as a result of the retarding of the spark.

14. The vehicle of claim 12, wherein the sensors are configured to generate the sensor data, and the processor is configured to at least facilitate determining whether the cold start emission reduction is required and providing the increase in torque provided by the electric motor as the combustion engine of the vehicle is being started and after the vehicle has already been travelling along a roadway powered by the electric motor.

15. The vehicle of claim 12, wherein the processor is further configured to at least facilitate:
: determining whether a shift is occurring in a transmission gear for the vehicle; and
: pausing the diagnostics when the shift is occurring in the transmission gear.

16. The vehicle of claim 12, wherein the processor is further configured to at least facilitate:
: determining whether a traction control event, a stability control event, or both, are occurring; and
: pausing the diagnostics when the traction control event, the stability control event, or both are occurring.

17. The vehicle of claim 12, wherein the processor is further configured to at least facilitate:
: reporting that the drive system has passed the diagnostics, when it is determined that both:
:: the torque of the combustion engine is both greater than a first threshold value and less than a second threshold value; and
:: the exhaust temperature of the combustion engine is greater than a third threshold value; and
: reporting that the driver system has failed the diagnostics, when it is determined that one or more of the following conditions are true:
:: the torque of the combustion engine is less than the first threshold value;
:: the torque of the combustion engine is greater than the second threshold value; or
:: the exhaust temperature of the combustion engine is less than the third threshold value.

18. The vehicle of claim 12, wherein the processor is further configured to at least facilitate:
: the first threshold value is equal to approximately 40 nm;
: the second threshold value is equal to approximately 80 nm; and
: the third threshold value is equal to approximately 400 degrees Celsius.

19. The vehicle of claim 12, wherein the processor is further configured to at least facilitate:
: reporting that the drive system has passed the diagnostics, when it is determined that both:
:: the torque of the combustion engine is both greater than 40 nm and less than 80 nm; and
:: the exhaust temperature of the combustion engine is greater than 400 degrees Celsius; and
: reporting that the driver system has failed the diagnostics, when it is determined that one or more of the following conditions are true:
:: the torque of the combustion engine is less than 40 nm;
:: the torque of the combustion engine is greater than 80 nm; or
:: the exhaust temperature of the combustion engine is less than 400 degrees Celsius.

20. The vehicle of claim 12, wherein the processor is further configured to at least facilitate:
: determining whether a shift is occurring in a transmission gear for the hybrid electric vehicle;
: determining, via the processor, whether a traction control event is occurring;
: determining, via the processor, whether a stability control event is occurring;
: determining, via the processor, whether an electric fault is detected;
: determining, via the processor, whether another engine fault is detected; and
: pausing the diagnostics, in accordance with instructions provided by the processor, when one or more of the following conditions are true:
:: a shift is determined to be occurring in the transmission gear for the hybrid electric vehicle;
:: a traction control event is determined to be occurring;
:: a stability control event is determined to be occurring;
:: an electric fault is detected; or
:: another engine fault is detected.

* * * * *